July 15, 1969 R. G. MYERS 3,456,128

DIFFERENTIAL AMPLIFIER VOLTAGE COMPARISON CIRCUITRY
INCLUDING A NETWORK FOR CONVERTING SPURIOUS
NORMAL MODE SIGNALS TO COMMON MODE SIGNALS

Filed Dec. 22, 1965 2 Sheets-Sheet 1

INVENTOR
RONALD G. MYERS
BY [signature]
ATTORNEY

INVENTOR
RONALD G. MYERS
BY Harold R. Patton
ATTORNEY

United States Patent Office 3,456,128

Patented July 15, 1969

3,456,128

DIFFERENTIAL AMPLIFIER VOLTAGE COMPARISON CIRCUITRY INCLUDING A NETWORK FOR CONVERTING SPURIOUS NORMAL MODE SIGNALS TO COMMON MODE SIGNALS

Ronald G. Myers, Bridgeton, Mo., assignor to Monsanto Company, St. Louis, Mo., a corporation of Delaware Filed Dec. 22, 1965, Ser. No. 515,683
Int. Cl. H03k 5/20
U.S. Cl. 307—235 4 Claims

ABSTRACT OF THE DISCLOSURE

A voltage comparator circuit including a differential amplifier consisting of two transistors having their respective base electrodes coupled to separate signal sources which provide signals to be compared. The base electrodes are interconnected by means of a resistor-capacitor network which passes normal mode noise signals superimposed on the signals to be compared, thereby converting these signals into common mode signals. These common mode signals are rejected by the differential amplifier circuit, and it triggers a tunnel diode which serves to provide a fast output signal.

Figure 1:
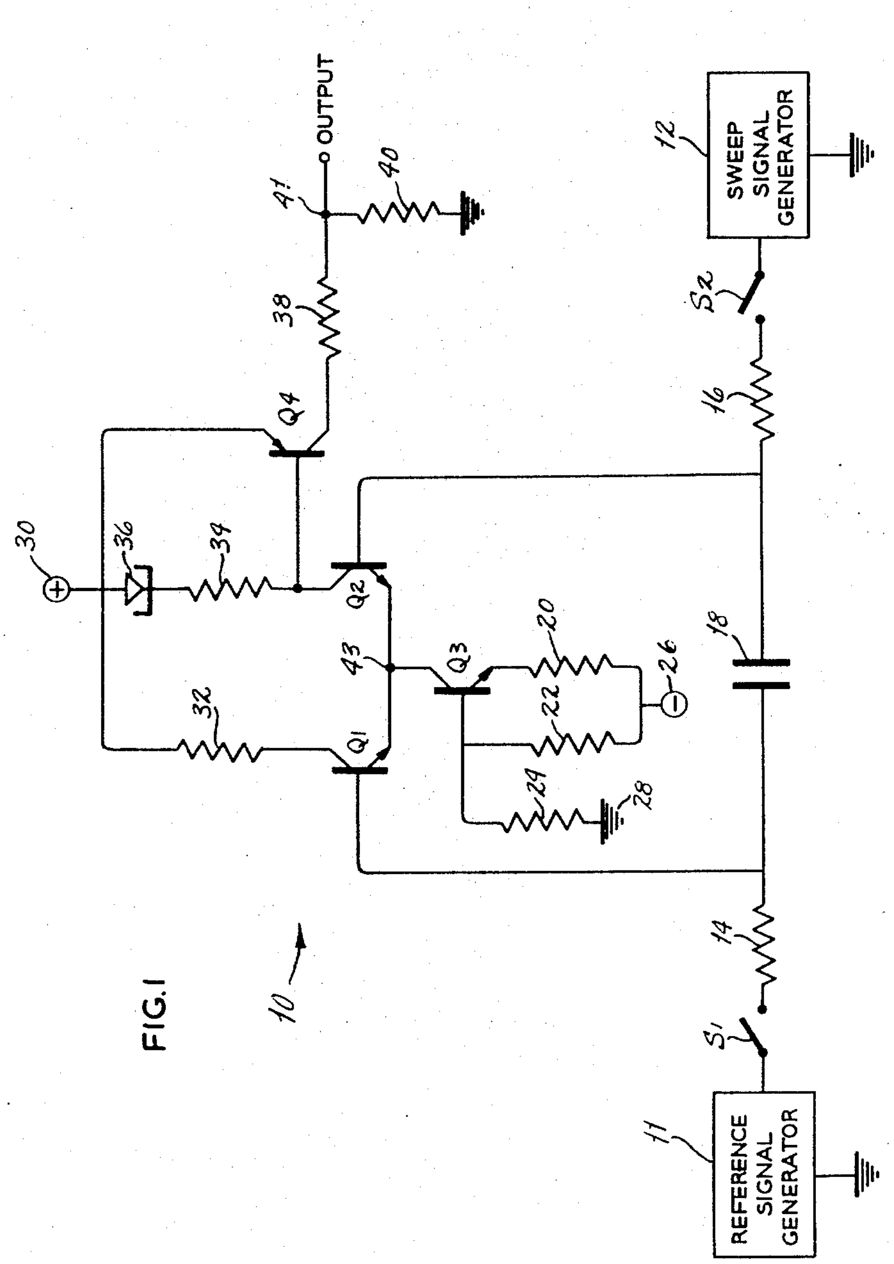

The present invention relates generally to electronic voltage comparison circuitry, and more particularly to voltage comparison circuitry having improved speed of operation and noise immunity characteristics.

In the design of high precision, electronic instruments it is often desired to provide timing circuits wherein a comparison is made between a reference or unknown signal and a generated signal, which exhibits a voltage variation as a function of time. For example, such comparisons are often used to convert an analog signal into a digital measurement signal in digital multimeter instruments, or the like.

Among the problems inherent in comparison measurements of this general type are (1) the inaccuracies which flow from slow switching speeds of the comparison circuit components, and (2) the spurious signals generated by noise signals which often accompany the signals to be compared. Both the slow switching speeds and spurious noise signals adversely affect the precision of the measuring instrument. Heretofore, complex and expensive compensation and filtering circuitry has been used in an attempt to diminish the measurement errors introduced by these inherent problems.

The general purpose of this invention is to provide voltage comparison circuitry which embraces the advantages of similarly employed voltage comparison circuits but does not possess the aforedescribed disadvantages. To attain this, the present invention utilizes the unique combination of a noise immune differential amplifier comparison circuit and a tunnel diode to provide an output pulse or step voltage, when the magnitude of a sweep signal coincides with that of a reference signal.

An object of the present invention is the provision of a novel linear sweep pick-off circuit with improved noise immunity.

Another object is to provide a voltage comparison circuit which is insensitive to spurious common mode signals applied to the comparison circuitry components.

A further object of the invention is the provision of an improved voltage comparison circuit having improved noise immunity characteristics and which provides a fast, snap-action type output signal upon the coincidence of a linear sweep signal with a reference signal.

In the present invention these objects (as well as other apparent herein) are achieved generally by providing a comparator circuit consisting of a transistorized differential amplifier having as its inputs a reference signal and a linear sweep signal. The differential amplifier has an output circuit which includes a normally-nonconducting transistor which is rapidly switched to its conducting state by a driving tunnel diode provided in the collector circuit of one of the differential amplifier transistors. The input circuitry to the differential amplifier includes an R-C coupling network which converts any normal mode noise signals superimposed upon the reference or linear sweep signals into a common mode signal which is applied to the inputs of the differential amplifier. In this manner, the superimposed noise signals are rejected by the comparison circuitry; a snap-action type pulse or step output signal being provided when there is true coincidence between the reference signal and the linear sweep signal.

Figure 2:
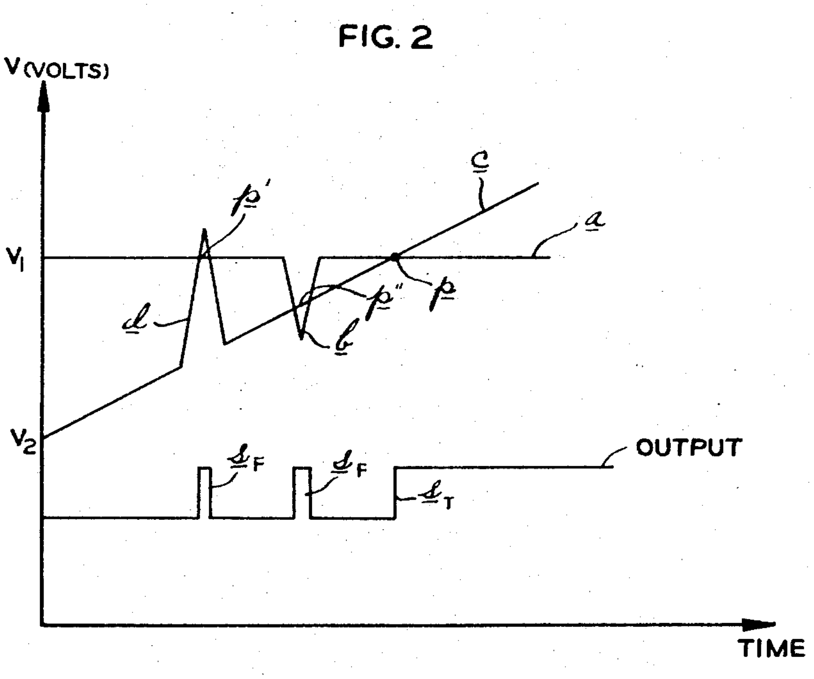
Figure 3:
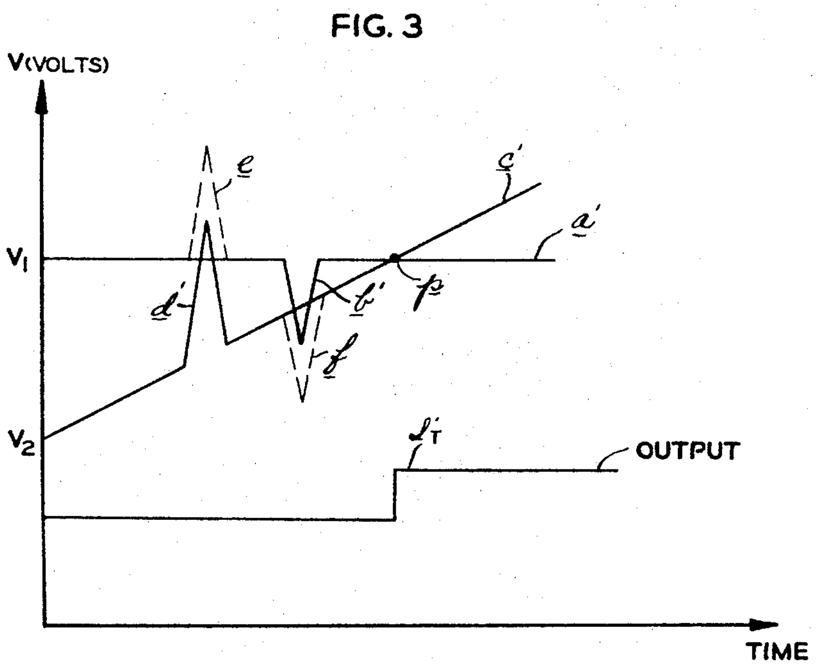

Utilization of the invention will become apparent to those skilled in the art from the disclosures made in the following description of a preferred embodiment of the invention, as illustrated in the accompanying drawing, in which:

FIG. 1 is a schematic circuit diagram of one type of linear sweep pick-off circuit designed in accordance with the present invention;

FIG. 2 is a graphical representation of a typical reference and a typical sweep signal having random noise superimposed thereon, and illustrating the effect of such noise on the output signals of a conventional prior-art comparison circuit; and FIG. 3 is a graphical representation of signals similar to those of FIG. 2 and illustrating the improved output signals of the noise immune voltage comparison circuitry of FIG. 1.

Referring now to the drawings, wherein like reference characters designate like or corresponding parts throughout the several views, there is shown in FIG. 2 a typical reference signal *a* whose general magnitude is denoted as $V_1$ volts. A downwardly-presented spike or pip *b* is shown to illustrate normal mode noise superimposed on the reference signal *a*. A linear sweep signal *c* is shown increasing from a voltage magnitude of $V_2$ volts and crossing the reference signal *a* at a point *p*. A normal mode noise signal in the form of an upwardly-presented pip or spike *d* is shown superimposed on the sweep signal *c*.

Heretofore, where the reference signal *a* and sweep signal *c* were compared in conventional prior-art voltage comparison circuits, the normal mode noise associated with either of these signals produced a false coincident point as indicated at points *p'* and *p''* of FIG. 2. Such false coincidence results in spurious outputs $s_F$ from the comparison circuitry. That is, the true coincidence of the reference signal *a* and the sweep signal *c* occurs only at point *p*; the output from the comparison circuitry should consist of only the step signal $s_T$. However, the introduction of the superimposed normal mode noise *b* and *d* on either the reference signal *a* or sweep signal *c* will result in the false coincident points *p'* and *p''*. The comparison circuitry, not being able to detect between the false coincident points *p'*, *p''* and the true coincident point *p*, will produce the spurious, undesired outputs $s_F$ of FIG. 2.

Referring now to FIG. 1, there is shown voltage comparison circuitry, generally designated 10, which substantially eliminates the false, spurious outputs caused by noise superimposed upon the reference signal *a* or the sweep signal *c*. A reference signal generator 11 is provided to generate a reference signal such as that designated *a'* in FIG. 3. It is this reference signal *a'* which is to be compared to a linear sweep signal *c'* generated by the linear sweep generator 12 of FIG. 1. The reference signal generator 11 is connected to the base electrode of an NPN transistor Q1 by means of a resistor 14 and a switch $S_1$. Similarly the sweep signal generator 12 is connected to the base of an NPN transistor Q2 by means of a resistor 16 and a switch $S_2$. The resistors 14 and 16 are coupled by a capacitor 18, which together with resistors 14 and 16 comprise an R-C filter or cross-over network, as will be more fully described hereinafter.

The emitters of the transistors Q1 and Q2 are connected together at the collector of a constant current transistor Q3. Biasing resistors 20, 22 and 24 are provided to connect the base and emitter electrodes of the constant current transistor Q3 to a negative power supply, designated generally 26, and ground potential, indicated generally 28.

The collector of transistor Q1 is connected to a positive power supply 30 by means of a load resistor 32. The collector of transistor Q2 is connected to the positive power supply 30 by means of a load resistor 34 which is provided in series with a tunnel diode 36. The tunnel diode 36 is a conventional device noted for its N-type volt-ampere characteristic which includes a negative resistance region. In the present invention it is employed as a high-speed switching element capable of switching from a low-voltage state to a high voltage state as the current is increased through it in the forward direction. The anode of the tunnel diode is connected to the positive power supply 30 and its cathode is connected to the load resistor 34.

The collector of transistor Q2 is also connected to the base of a normally-nonconducting PNP transistor Q4. The emitter of the transistor Q4 is connected to the positive power supply 30 and its collector is coupled to a voltage divider network consisting of resistors 38 and 40. The terminal point 41 between the resistors 38, 40 serves as the output terminal for the voltage comparator circuitry 10 of FIG. 1.

In operation the transistors Q1 and Q2 comprising the differential amplifier are biased so that with switch $S_1$ closed and switch $S_2$ open, transistor Q2 is normally-nonconducting and transistor Q1 is heavily conducting. That is, when the reference signal *a'* (FIG. 3) is applied to the base of transistor Q1 by closing switch $S_1$, transistor Q1 will be forward biased and current will flow from power supply 30, through the load resistor 32, the collector-emitter path of transistor Q1, the collector-emitter path of constant current transistor Q3, to the negative power supply 26. The transistor Q3 operates as in conventional differential amplifiers to provide a substantially constant current from the junction point 43 of the common emitters to the negative power supply 26.

In this initial state the transistor Q1 clamps the emitter of transistor Q2 at a sufficiently high potential to maintain it cut-off. The transistor Q2 will remain cut-off until the signal applied to its base by sweep signal generator 12 is sufficient to forward bias the base-emitter junction thereof.

With transistor Q2 cut-off, substantially no current flows through the tunnel diode 36 and the voltage across it is insufficient to forward-bias the normally-nonconducting output transistor Q4. Therefore, no signal appears at the output terminal 41.

However, assume that at some time after $S_1$ is closed to establish the aforedescribed quiescent condition, that $S_2$ is closed to apply the linear sweep signal *c'* (FIG. 3) to the base of transistor Q2. Since the magnitude of sweep signal *c'* is initially much less than the reference signal applied to the base of transistor Q1, transistor Q2 will remain nonconducting. However, as sweep signal *c'* increases and passes through the magnitude of $V_1$ volts corresponding to the reference signal *a'*, it will forward bias transistor Q2 to its conducting state and a small amount of current will be diverted from the conducting side of the differential amplifier, i.e. from the transistor Q1 circuit, to the other side, i.e. the transistor Q2 circuit. As current begins to be switched into the transistor Q2 circuit, the tunnel diode 36 will rapidly assume its low voltage state of operation, and then as the current continues to increase, it will switch to its high voltage state of operation, as is well known in the art.

When the tunnel diode 36 switches to its high voltage state of operation, the voltage across it and the voltage drop across resistor 34 will cause output transistor Q4 to become forward biased. When this occurs, current will be delivered from positive power supply 30, through the emitter-collector path of the transistor Q4 to the voltage divider network 38, 40. As is well known in the art, the switching of tunnel diode 36 is extremely fast, thereby providing a step function output having a very short rise time. Thus, the voltage comparator circuit 10 produces a snap-action output signal $s'_T$ at the coincidence of the reference signal *a'* and sweep signal *c'*.

Of at least equal importance is the fact that the differential amplifier comparison circuit 10 is provided with the R-C coupling or cross-over network consisting of resistors 14, 16 and capacitor 18. The values of the resistors 14, 16 and the capacitor 18 are not critical but depend largely on the spectra of the sweep signal, the normal mode noise, and the driving point impedance of the signals to be compared. Any normal mode noise which might be inherent in either the reference signal or the sweep signal is applied simultaneously to the bases of both differential amplifier transistors Q1 and Q2, see the dashed line pips *e* and *f* of FIG. 3. In essence, the noise has been converted from a normal mode noise signal into a common mode signal applied to both inputs of the differential amplifier. As is well known, the differential amplifier is relatively insensitive to common mode signals since its output is proportional to the difference between the input signals. Thus any common mode signal influence on the circuit is cancelled. As is apparent from the dashed lines *e* and *f* of FIG. 3 any noise superimposed on the reference signals or sweep signal of the circuit of FIG. 1 is applied to both inputs of the differential amplifier portion of the circuit 10 and does not produce any false, spurious outputs. Instead the step output $s'_T$ is obtained only when there is true coincidence of the reference and sweep signals.

The following are illustrative of the values that the circuit parameters may assume in an exemplary embodiment of the invention:

| | |
|---|---|
| Resistances: | Ohms |
| 14 | 82 |
| 16 | 82 |
| 20 | 5.6K |
| 22 | 12K |
| 24 | 3K |
| 32 | 5.6K |
| 34 | 3.6K |
| 38 | 10K |
| 40 | 1K |
| Diode 36 (General Electric Co.) | IN3712 |
| Capacitor 18 | .024 μf. |
| Transistors: | |
| Q1, Q2 (Fairchild Semiconductor Co.) | 3565 |
| Q3 (General Electric Co.) | 2N3417 |
| Q4 (Motorola Co.) | 2N3250 |
| Power supplies: | Volts |
| 26 | −15 |
| 30 | +30 |

Many modifications and variations of the invention are possible in view of the above teachings. For example, it is contemplated the quiescent state of the differential amplifier portion of the circuitry may involve an established current flow in both sides thereof. Thus, a change in this current flow upon the coincidence of the reference and sweep signals would be employed to bring about the switching action of the tunnel diode 36. Therefore, it is to be understood that the invention may be practiced otherwise than as specifically described.

I claim:

1. For use as a linear sweep pick-off circuit with improved noise immunity, a voltage comparator circuit comprising means for generating a reference signal, means for generating a substantially linear sweep signal, comparator circuit means having first and second inputs operatively connected to said reference signal generating means and said sweep signal generating means respectively, said comparator circuit means being characterized by its rejection of common mode signals applied to said first and second inputs and including an output circuit responsive to said applied signals to produce an output signal when said reference signal and said linear sweep signal reach predetermined magnitudes with respect to each other, together with circuit means operatively connected between said reference and linear sweep signal generating means and coupling same to said first and second inputs of said comparator circuit means, for coupling normal mode noise signals superimposed on said reference and said linear sweep signals to said second and first inputs of said comparator circuit means respectively, whereby normal mode noise signals superimposed on the sweep signal and reference signal are converted to common mode signals and thereby prevented from generating spurious output signals at said comparator circuit means.

2. The voltage comparator circuit as defined in claim 1, wherein said comparator circuit means comprises a differential amplifier including first and second transistors whose emitters are connected together, the base of said first transistor being connected to said reference signal generating means and the base of said second transistor being connected to said sweep signal generating means, and circuit means for supplying electrical power to the collectors of said first and second transistors.

3. The voltage comparator circuit as defined in claim 2, wherein said output circuit of said comparator circuit means comprises a tunnel diode connected in said collector power supply circuit of said second transistor and characterized by two stable states of operation, whereby said tunnel diode may be switched from one state to another when said signals reach said predetermined magnitude, a third transistor having said tunnel diode connected across its base-emitter junction and driven thereby, and a resistance connected to the collector of said third transistor, whereby the voltage across said resistance provides a snap-action step signal upon the switching of said tunnel diode.

4. For use as a linear sweep pick-off circuit with improved noise immunity, a voltage comparison circuit comprising means for generating a reference signal, means for generating a substantially linear sweep signal, a differential amplifier including first and second transistors, the base of said first transistor being connected to said reference signal generating means and the base of said second transistor being connected to said sweep signal generating means, said differential amplifier including an output circuit responsive to said applied signals to produce an output signal when said reference signal and said linear sweep signal reach predetermined magnitudes with respect to each other, said differential amplifier output circuit including a tunnel diode coupled to the collector electrode of one of said transistors and characterized by two stable states of operation, whereby said tunnel diode may be switched from one state to another when said signals reach said predetermined magnitude, said differential amplifier output circuit further including a third transistor having said tunnel diode connected across its base-emitter junction and driven thereby, and a load resistor connected to the collector of said third transistor, together with a normal mode noise coupling circuit including an R-C network having a band pass characteristic such that normal mode noise superimposed on said reference and sweep signals is passed by and applied to said base electrodes of said first and second transistors.

References Cited

UNITED STATES PATENTS

| | | | |
|---|---|---|---|
| 2,941,155 | 6/1960 | Lucas | 330—69 |
| 2,949,546 | 8/1960 | McVey | 330—30 |
| 3,054,910 | 9/1962 | Bothwell | 307—235 |
| 3,128,435 | 4/1964 | Mleczko et al. | 328—147 |
| 3,215,854 | 11/1965 | Mayhew | 330—30 |
| 3,328,607 | 6/1967 | Stromer | 307—235 |

ARTHUR GAUSS, Primary Examiner

H. A. DIXON, Assistant Examiner

U.S. Cl. X.R.

307—322; 330—30, 69